Nov. 1, 1927.
J. RAU
1,647,541
GLASS FEEDING TROUGH
Filed Jan. 28, 1927
2 Sheets-Sheet 2
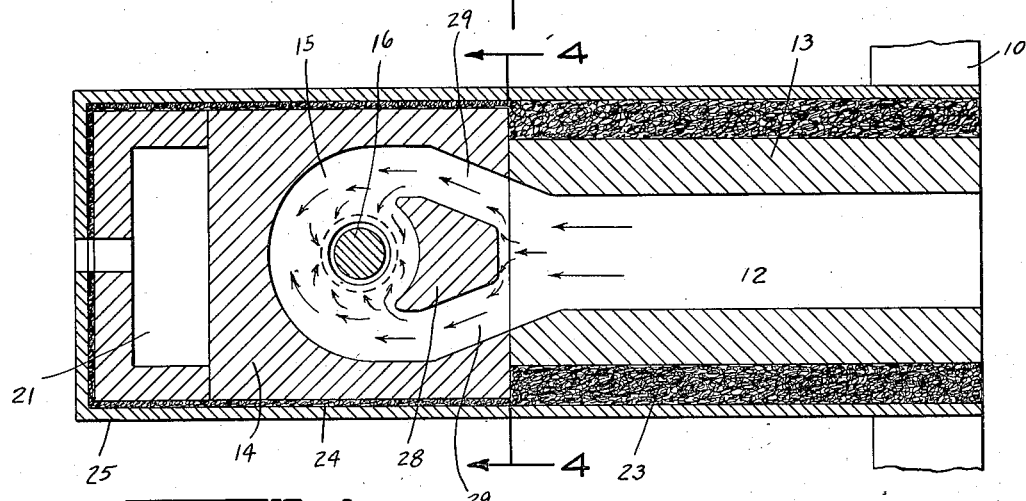
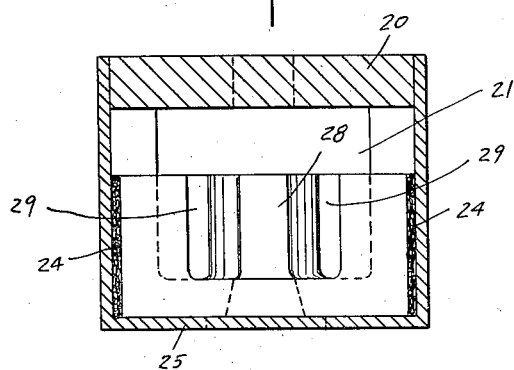
INVENTOR.
JOHN RAU.
BY
ATTORNEYS.

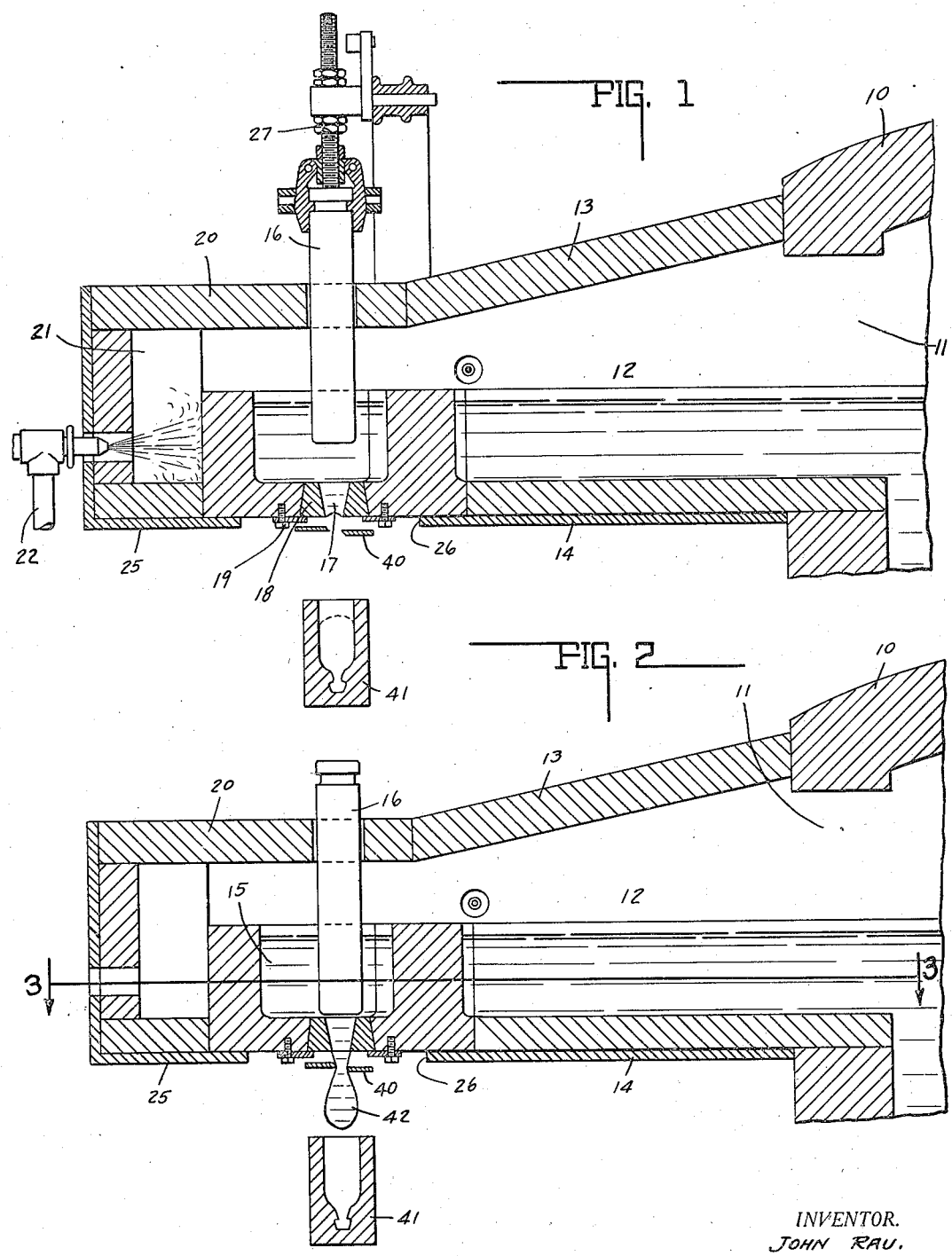

Patented Nov. 1, 1927.

1,647,541

UNITED STATES PATENT OFFICE.

JOHN RAU, OF INDIANAPOLIS, INDIANA, ASSIGNOR TO FAIRMOUNT GLASS WORKS, OF INDIANAPOLIS, INDIANA, A CORPORATION.

GLASS-FEEDING TROUGH.

Application filed January 28, 1927. Serial No. 164,143.

This invention relates to an automatic glass feeder for discharging molten glass into a mould.

The main object of this invention is to provide an improved discharge spout and feed mechanism, whereby molten glass discharged into the mould will have throughout its content a substantially uniform temperature, and which will have as a result thereof, substantially uniform viscosity.

The chief feature of the invention consists in the provision of a feeder box associated with the plunger and spout of a glass feeding mechanism which secures the discharge of uniformly heated glass to and through the mouth of the spout to the mould, whereby the gob or gather has a symmetrical shape and is of a substantially uniform temperature and viscosity throughout, particularly when the gobs are of large volume for the making of large glass articles.

Another feature of the invention consists in the arrangement of a dividing block or partition in the feeder box such that a plurality of streams of glass are presented to the mouth of the spout in opposed relation, and said streams of glass are so arranged that the discharge to the mouth of the block follow diverging paths so as to encircle said mouth, whereby the mouth is completely surrounded by glass of a substantially even viscosity, and an increased swirling motion is obtained.

The full nature of the invention will be understood from the accompanying drawings and the following description and claims.

In the drawings, Fig. 1 is a longitudinal central sectional view through a glass feeding mechanism with the plunger in non-feeding position. Fig. 2 is a similar view showing the plunger in gob forming position and the cutting off mechanism in initial cutting off position. Fig. 3 is a transverse sectional view taken on line 3—3 of Fig. 2 and in the direction of the arrows. Fig. 4 is a transverse sectional view taken on line 4—4 of Fig 3 and in the direction of the arrows.

In the drawings, 10 indicates a wall of a glass furnace having an opening 11 communicating with a glass feeding spout 13 including a channel 12 in which molten glass is adapted to flow. A feeder box 14 includes a chamber 15 in which operates a glass feeding plunger 16, the same cooperating with the orifice or outlet 17 formed in a removable and replaceable outlet bushing 18 retained in position by the plate 19.

The feeder box 19 is shown covered as at 20 and enclosed as at 21, and a nozzzle 22 is adapted to direct flames against the box to maintain the same at a high temperature so as to reduce chilling of the molten glass to a minimum. Suitable insulation, such as asbestos, 23 surrounds the channel 12 and insulation 24 surrounds the box and spout construction, and the aforesaid is retained in position by the casing 25 which, however, is provided with the opening 26 registering with the outlet 17. Suitable mechanism 27 secures the desired reciprocation of plunger 16 in the chamber.

The flow of glass from channel 12 to orifice or outlet 17 is divided into a plurality of streams by a dividing block 28, the wall or block herein being shown integral with the feeder box. The position of the block forms two passages 29 which communicate at one end with the spout channel 12 and at their other ends with the feeding chamber. The adjacent wall of the block is spaced at an appreciable distance from the orifice 17 so that the glass discharged into the chamber through said passages passes therein and has a swirling movement through the chamber and about the orifice. The glass flow is also in opposed relation so that the glass completely envelops the orifice and full peripheral discharge is obtained therethrough.

As shown in Fig. 3, the partition or dividing block 28 is heated by the molten glass flowing through the several diverging passages 29 and, of course, the back wall which is arcuate, and forms part of the chamber wall, will also be heated. The outer wall of the chamber 15, that is, that portion which is fartherst removed from the spout channel 12, is not only heated by the nozzle 22, but also is heated by a portion of the glass when the stream passes along said wall from opposite directions and which meet substantially in the center before turning inwardly into the chamber and to the orifice. Thus, the hotter portions of the glass are those portions which are discharged through the orifice and all the glass discharged will be substantially the same temperature. The result of the foregoing is that when the plunger 16 is operated, liquid glass will discharge from orifice 17 and will gradually pass downwardly therethrough and through the shears 40 positioned immediately therebeneath into a mould 41 upon severance by the shears. The gather or gob 42 with the present construction of the feeder box is substantially circular in transverse cross section since each section is substantially of uniform temperature throughout.

This uniformity of section is obtained by uniformity of temperature and the uniformity of temperature is obtained through the employment of the dividing block in the feeder box shown. Heretofore in large vessels or glass articles such as five-gallon bottles and the like, the gather or gob was of such size that chilled glass and hot glass would be substantially discharged together, and the chilled glass would form ridges on the hotter glass and thus a non-uniform gob or gather would be obtained which would not uniformly fill the mould. As a result, distortion was produced in the final product, as well as non-symmetrical distribution of glass. The present invention, therefore, secures the discharge of a gather of glass having uniform viscosity.

It will be noted that a further advantage of the invention resides in the position of the dividing block in front of the plunger, or in other words, between the plunger and the furnace, whereby it will protect the plunger against the pressure of flow of the hot glass coming directly from the furnace. Difficulty has heretofore been experienced wherein there has been no such protecting block, wherein such pressure has sprung the plunger or caused it to cock to one side so as to prevent its proper action, thus necessitating the shut down of the device for the purpose of straightening the position of the plunger.

From the foregoing it will be noted that the pressure exerted by the hot glass coming directly from the furnace will displace the chilled glass on the opposite side of the orifice or plunger by reason of the direction of the stream of glass thereabout. Without the dividing block or some other means for diverting the direct flow into the orifice, the chilled glass accumulated on the opposite side thereof acts to fill about a third or the orifice so that two-thirds of the gob will run fast, while one-third will be relatively slow so as to distort it as above mentioned.

The invention claimed is:

A feeder block for glass feeding mechanism, including a chamber having a discharge outlet near the lower end thereof and in spaced relation from the walls of said chamber, and a plurality of divergingly directed passages having tangential discharge into said chamber at diametrically positioned points of tangency.

In witness whereof, I have hereunto affixed my signature.

JOHN RAU.